June 24, 1930.   C. L. HALL   1,768,475
SEPARABLE FASTENER
Filed April 10, 1928
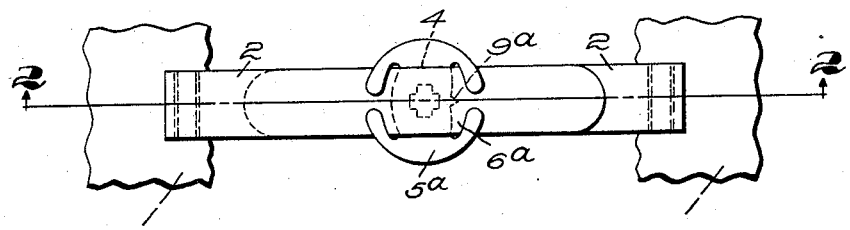
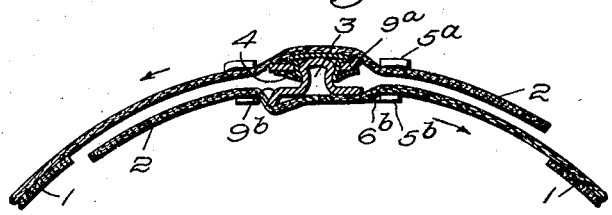
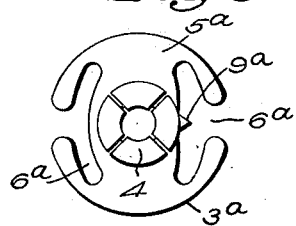 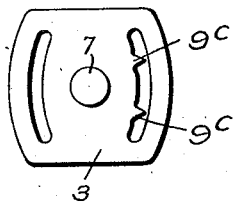 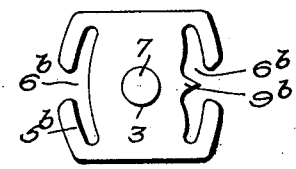
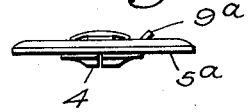 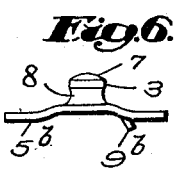
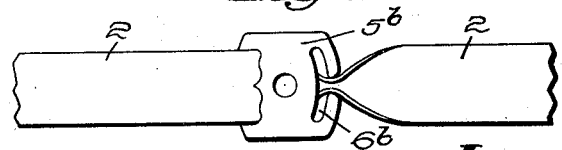
Inventor:
Charles L. Hall
by Emery, Booth, Janney & Varney
Attys Patented June 24, 1930

1,768,475

UNITED STATES PATENT OFFICE

CHARLES L. HALL, OF GREAT NECK, NEW YORK, ASSIGNOR, BY MESNE ASSIGNMENTS, TO UNITED-CARR FASTENER CORPORATION, OF CAMBRIDGE, MASSACHUSETTS, A CORPORATION OF MASSACHUSETTS

SEPARABLE FASTENER

Application filed April 10, 1928. Serial No. 268,832.

My invention aims to provide improvements in separable fasteners and is directed more particularly to fastener members for attachment to strips and having sliding engagement therewith.

In the drawings, which illustrate a preferred embodiment of the invention:

Figure 1 is an elevation of the fastener shown in use on the straps of an overshoe, glove or the like, parts thereof being broken away;

Fig. 2 is an enlarged section on the line 2—2 of Fig. 1 showing the fastener and portions of the strap elements;

Fig. 3 shows an underside elevation of a socket member;

Fig. 4 shows a plan of a stud member;

Fig. 5 is a side elevation of the socket shown in Fig. 3;

Fig. 6 is a side elevation of the stud shown in Fig. 4;

Fig. 7 is a view showing how a strap is inserted in the slots provided in the bases of the fastener units; and Fig. 8 is a plan of another form of fastener member.

Referring to the drawings, I have shown a stud and socket fastener particularly, though not exclusively, useful in adjustably securing the ends of a strap or straps. Both of the fastener units (the stud and the socket) are slidable relative to their respective carrying straps, so that they may be readily adjusted relative to each other.

In Figs. 1 and 2, I have shown portions 1 of an article to which straps 2 are secured. For the purposes of illustration merely, I have elected to show a sliding stud unit 3 and a sliding socket unit 3$^a$. It is to be understood, however, that ordinarily one of the units is fixed with relation to its support.

The socket unit is shown as being slidably secured to its strap part 2 (Fig. 2) and includes a base or attaching part 5$^a$ and stud-receiving means 4. The attaching part is provided at each end with substantially T-shaped slots 6$^a$, through which the strap 2 may slide. The T-shaped slots 6$^a$ permit easy attachment and detachment of the socket unit with relation to the strap part 2. Instead of threading the strap part 2 through the slots 6 in the usual manner, I fold the strap so that the longitudinal edges are brought together as shown in Fig. 7, and they are then inserted through the connecting portion of a slot to the main strap-receiving portion.

In order to prevent slipping of the socket relative to the strap part 2, when it is engaged with a stud and stress is exerted laterally, I have provided a sharp, pointed, toothlike prong 9$^a$. This prong 9$^a$ is pressed from the base 2 and extends angularly therefrom and intersects one of the slots 6$^a$, as shown in Fig. 3. This prong 9$^a$ will catch in the strap 2 (Fig. 2) or may be forced through the strap, so that when stress is exerted in one direction the socket will not slip. The socket will slide readily in the opposite direction and may be easily and quickly adjusted. Two or more prongs 9$^a$ may be provided on the socket-attaching part as shown on the stud part illustrated in Fig. 8.

The stud-receiving part 4, before attachment to the attaching part 5$^a$, includes a tubular-shaped portion closed at one end, an inwardly extending ledge portion at the other end and an outwardly extending flange which slopes from the ledge portion toward the closed end of the tubular part. This stud-receiving part is divided by a plurality of slits extending from the flange through the tubular portion and terminating at the closed end portion of the tubular portion. Thus the stud-receiving portion is divided into a plurality of expansible and contractible stud-engaging fingers. Any type of stud receiving means may be used instead of the one above described. The socket above described is substantially the same as more fully shown and illustrated in Patent No. 1,711,459, dated April 30, 1929, and issued to T. W. Johnson.

The prong 9$^a$ is back-supported at its base where it joins the base or attaching portion 5$^a$ by the end portions of the fingers which engage the under surface of the base 5$^a$, as shown in Fig. 2. This back-supporting of the prong 9ª makes it more rigid and, therefore, less apt to be bent out of its proper position with relation to a slot 6ª.

The stud unit 3 may be secured to its strap portion 2 in any suitable manner and the head and neck portions of the stud member may be of any suitable contour to provide proper engagement with the stud-receiving part 4. When the stud member illustrated in Fig. 2 is engaged with the socket, the head 7 of the stud is located in the cup-shaped portion of the stud-receiving part 4 and the ledge portion engages back of the shoulder provided between the head 7 and neck 8 of the stud.

The stud unit may be provided with a base or attaching portion 5ᵇ, which is provided with slots 6ᵇ similar to the T-shaped slots 6ª of the socket unit and for the same purpose. I have also provided the stud unit with a prong 9ᵇ or prongs 9ᶜ, Fig. 8, which intersect a slot 6ᵇ for the same purpose as the prong 9ª of the socket unit. It is unnecessary to go into further detail in describing the stud unit, as the only substantial difference between the stud unit and socket unit is in the fastener element part.

When the fastener units are used on overshoes, for instance, stresses are exerted upon the straps 2 in the directions of the arrows (Fig. 2) when a person is walking. With the prongs 9ª and 9ᵇ pointing toward the ends of their respective straps 2, the points thereof tend to press into the straps and prevent slipping of the fastener elements.

The fastener units illustrated and described are extremely simple, durable and efficient and have a wide range of uses.

While I have shown and described a preferred embodiment of my invention, I do not wish to be limited thereto, my invention being best described in the following claims.

Claims:

1. A snap fastener unit for adjustable attachment to a strap or like support comprising a base portion having slots for reception of a strap, snap fastener means presented between the slots for cooperative engagement with another snap fastener unit, means providing an opening at one edge of the base and adjacent one of said slots whereby said base may be attached to a strap by entering the edges of the strap through said opening, and a prong formed integral with the base portion intersecting the slot opposite the opening at the edge of the base portion, said prong being directed toward said opening and adapted to hold the fastener unit against slipping relative to the strap in at least one direction.

2. A snap fastener unit for adjustable attachment to a strap or like support comprising a base portion having two T-shaped slots formed therein at opposed edges to receive a strap by insertion of the edges thereof through those portions of the T's which extend to the edges of the base portion, a snap fastener portion located between said slots and a sharp pointed strap-engaging prong formed integral with said base portion and extending toward one of the portions of the T through which the strap enters.

3. A snap fastener unit for adjustable attachment to a strap or like support comprising a base portion having slots for reception of a strap, snap fastener means presented between the slots for cooperative engagement with another snap fastener unit, means providing an opening at one edge of the base and adjacent to one of said slots whereby said base may be attached to a strap by entering the edges of the strap through said opening and prong means intersecting at least one of the slots and located substantially opposite the opening through which the strap is entered to prevent interference with the entering operation of the strap while being adapted to hold the fastener unit against slipping relative to the strap in at least one direction.

In testimony whereof, I have signed my name to this specification.

CHARLES L. HALL.